(12) United States Patent
Tezaur

(10) Patent No.: US 8,860,838 B2
(45) Date of Patent: Oct. 14, 2014

(54) AUTOMATIC ILLUMINANT ESTIMATION AND WHITE BALANCE ADJUSTMENT BASED ON COLOR GAMUT UNIONS

(75) Inventor: Radka Tezaur, Mountain View, CA (US)

(73) Assignee: Nikon Corporation, Tokyo (JP)

( * ) Notice: Subject to any disclaimer, the term of this patent is extended or adjusted under 35 U.S.C. 154(b) by 224 days.

(21) Appl. No.: 13/119,632

(22) PCT Filed: Sep. 24, 2008

(86) PCT No.: PCT/US2008/077568
§ 371 (c)(1),
(2), (4) Date: Mar. 17, 2011

(87) PCT Pub. No.: WO2010/036248
PCT Pub. Date: Apr. 1, 2010

(65) Prior Publication Data
US 2011/0164145 A1 Jul. 7, 2011

(51) Int. Cl.
*H04N 9/73* (2006.01)
(52) U.S. Cl.
CPC ...................................... *H04N 9/735* (2013.01)
USPC ..................................... 348/223.1; 348/224.1
(58) Field of Classification Search
CPC ... H04N 5/222; H04N 1/6025; H04N 1/6027; H04N 1/6077; H04N 9/73; H04N 1/6058; H04N 9/64; H04N 9/77
USPC .............................. 348/222.1–228.1; 358/516
See application file for complete search history.

(56) References Cited

U.S. PATENT DOCUMENTS 5,752,106 A 5/1998 Yamano
6,038,339 A * 3/2000 Hubel et al. ................... 382/162
(Continued)

FOREIGN PATENT DOCUMENTS

WO WO2010036240 A1 4/2010
WO WO2010036246 A1 4/2010
(Continued)

OTHER PUBLICATIONS

PCT International Search Report and Written Opinion for PCT/US2008/077568 (related to present application) dated Dec. 4, 2008, Nikon Corporation.
(Continued)

*Primary Examiner* — Roberto Velez
*Assistant Examiner* — Pritham Prabhakher
(74) *Attorney, Agent, or Firm* — Roeder & Broder LLP

(57) ABSTRACT

A system for estimating an illuminant of a scene that was captured by an input image includes a control system that generates an input gamut that includes the input colors for the input image. Further, the control system compares the input gamut to an illuminant database that includes separate information from a gamut of observable colors for a plurality of possible illuminants to estimate the possible illuminant. Each illuminant can be represented by a separate illuminant gamut. Moreover, each gamut can be organized as a matrix. Additionally, the control system can combine the input gamut with each of the illuminant gamuts to generate a separate union gamut for each of the possible illuminants. The control system can compare the union gamut and the corresponding illuminant gamut for each possible illuminant to estimate the illuminant. After estimating the possible illuminant, the control system performs color correction on the input image.

15 Claims, 6 Drawing Sheets

(56) References Cited

U.S. PATENT DOCUMENTS

| | | | |
|---|---|---|---|
| 6,711,293 | B1 | 3/2004 | Lowe |
| 6,744,923 | B1 | 6/2004 | Zabih et al. |
| 6,973,212 | B2 | 12/2005 | Boykov et al. |
| 7,019,776 | B1 | 3/2006 | Lin |
| 7,720,371 | B2 | 5/2010 | Hong et al. |
| 7,885,458 | B1 * | 2/2011 | Lin ............... 382/167 |
| 7,889,207 | B2 | 2/2011 | Hong et al. |
| 8,013,928 | B2 * | 9/2011 | Egawa ............ 348/345 |
| 8,054,346 | B2 * | 11/2011 | Numata ........... 348/241 |
| 8,059,904 | B2 * | 11/2011 | Hoshuyama ....... 382/254 |
| 8,208,750 | B2 * | 6/2012 | Fischer et al. .... 382/274 |
| 2002/0113881 | A1 | 8/2002 | Funston et al. |
| 2004/0008886 | A1 | 1/2004 | Boykov |
| 2004/0201766 | A1 | 10/2004 | Funston et al. |
| 2004/0258305 | A1 | 12/2004 | Burnham et al. |
| 2005/0169519 | A1 | 8/2005 | Minakuti et al. |
| 2005/0271273 | A1 | 12/2005 | Blake et al. |
| 2007/0031037 | A1 | 2/2007 | Blake et al. |
| 2008/0025627 | A1 | 1/2008 | Freeman et al. |
| 2008/0175508 | A1 | 7/2008 | Bando et al. |
| 2008/0175576 | A1 | 7/2008 | Hong |
| 2008/0219549 | A1 | 9/2008 | Dolan et al. |
| 2009/0141975 | A1 * | 6/2009 | Li ............... 382/167 |
| 2010/0086206 | A1 | 4/2010 | Hong |
| 2010/0260431 | A1 | 10/2010 | Tezaur |
| 2010/0266218 | A1 | 10/2010 | Tezaur |
| 2010/0272356 | A1 | 10/2010 | Hong |
| 2010/0316305 | A1 | 12/2010 | Hong |
| 2011/0019909 | A1 | 1/2011 | Farid et al. |
| 2011/0019932 | A1 | 1/2011 | Hong |

FOREIGN PATENT DOCUMENTS

| | | | |
|---|---|---|---|
| WO | WO2010036247 | A1 | 4/2010 |
| WO | WO2010036248 | A1 | 4/2010 |
| WO | WO2010036249 | A1 | 4/2010 |
| WO | WO2010036250 | A1 | 4/2010 |
| WO | WO2010036251 | A1 | 4/2010 |

OTHER PUBLICATIONS

Murali Subbarao, Tae Choi, Arman Nikzad, "Focusing Techniques", Tech. Report Sep. 4, 1992, Dept. of Electrical Engineering, State Univ. of NY at Stony Brook, Stony Brook, NY 11794-2350.

Agarwala et al., "Interactive digital photomontage", pp. 1-9, Proceedings of ACM SIGGRAPH 2004, http://grail.cs.washington.edu/projects/photomontage.

Li Hong and George Chen, "Segment-based Stereo Matching Using Graph Cuts", 0-7695-2158-4/04 (C) 2004 IEEE, Proceedings of IEEE computer vision and pattern recognition 2004.

Milan Mosny et al., Multispectral color constancy: real image tests, School of Computing Science, Simon Fraser University, Burnaby, BC, Canada V5A 1S6, Human Vision and Electronic Imaging XII, SPIE vol. 6492, Jan. 2007, San Jose, CA (Copyright SPIE 2007).

M. Bertero and P. Boccacci, A Simple Method for the Reduction of Boundary Effects in the Richardson-Lucy Approach to Image Deconvolution, Mar. 17, 2005, Astronomy and Astrophysics manuscript No. aa2717-05, DISI, University of Genova, Genova Italy.

David S.C. Biggs and M. Andrews, Acceleration of Iterative Image Restoration Algorithms, Mar. 10, 1997, vol. 36, No. 8 pp. 1766-1775, Applied Optics, Optical Society of America, US.

Robert J. Hanisch et al., Denconvolution of Hubble Space Telescope Images and Spectra, Space Telescope Science Institute, Baltimore, MD, 1997, Chapter 10, pp. 310-361, Deconvolution of Images and Spectra Second Edition, Acadamic Press, Space Telescope Science Institute, Baltimore, Maryland, US.

L.B. Lucy, An Iterative Technique for the Rectification of Observed Images, The Astronomical Journal, 1974, vol. 79: pp. 745-754, University of Chicago, US.

W.H. Richardson, Bayesian-based Iterative Method of Image Restoration, J. Opt. Soc. Am., 1972, vol. 62, pp. 55-59, NW Washington, DC, US.

Advance E-mail PCT Notification Concerning Transmittal of Copy of Preliminary Report on Patentability, along with copy of Written Opinion dated Dec. 4, 2008 for PCT/US2008/077568 (related to the present application), publication date Apr. 7, 2011, Nikon Corporation.

* cited by examiner

Camera
710

Adjustment System

AUTOMATIC ILLUMINANT ESTIMATION AND WHITE BALANCE ADJUSTMENT BASED ON COLOR GAMUT UNIONS

BACKGROUND

Cameras are commonly used to capture an image of a scene including one or more objects. The color of light reflected from the objects in the scene will vary according to the color of the illuminant that is illuminating the scene. For example, daylight at midday is bluer than in the morning or afternoon which includes more yellow. As a result thereof, for example, a white object captured with a typical film type camera will appear as a different color when captured at midday than in the morning or afternoon.

Digital cameras typically include a program that first estimates the color of the illuminant, and subsequently adjusts all of the colors in an input image according to the color of the illuminant. This is commonly referred to as white balance correction. With white balance correction, the digital camera attempts to compensate for variations in the colors in the input image caused by illuminants of different colors, and the actual color of the objects in the scene are more accurately represented in the provided image.

Unfortunately, existing white balance correction programs have not been able to quickly and accurately estimate the correct illuminant in all situations. As a result thereof, the color correction is not satisfactory in all situations. Further, some white balance correction programs are extremely complex to implement and are computationally expensive.

SUMMARY

The present invention is directed to system for estimating an illuminant of a scene that was captured by an input image that includes a plurality of input colors. The system includes a control system that generates an input gamut from the input colors of the input image. The input gamut is organized as a matrix having a plurality of rows and columns. Further, the control system compares the input gamut to an illuminant database that includes separate information from a gamut of observable colors for a plurality of possible illuminants to estimate the possible illuminant. In this embodiment, each illuminant gamut is also organized as a matrix having a plurality of rows and columns. Additionally, the control system can combine the input gamut with each of the illuminant gamuts to generate a separate union gamut for each of the possible illuminants. Moreover, the control system can compare the union gamut and the corresponding illuminant gamut for each possible illuminant to estimate the illuminant.

As provided herein, in certain embodiments, each gamut can be a two dimensional binary matrix. Thus, the values at each location in each gamut are expressed as either a "0" or "1" and are not color values. For example, "1" at a particular location can represent that a particular color is present in the gamut, while "0" in that location represents that this particular color is not present in the gamut. The coordinate system for the colors can be in chromatic space. For each matrix, each entry in the matrix corresponds to one point in the color space, lying on the selected discrete matrix, i.e., to one particular color. Thus, the value assigned to each location of the matrix, either "1" or "0" is what is important.

As provided herein, all comparisons between the matrixes are done in the same color space.

With the present design, the control system can accurately estimate the possible illuminant from the illuminant database with relatively simple computations. As a result thereof, the control system can also apply the correct level of color adjustment to the input image to provide an adjusted image that accurately approaches the true colors in the scene.

As utilized herein, the terms "true colors" or "actual colors" shall mean the colors that are present at the scene when the scene is illuminated by a white light, such as standard illuminant D65.

In one embodiment, the control system (i) determines a gamut difference that represents the difference between the union gamut and the corresponding illuminant gamut for each possible illuminant, (ii) compares the gamut differences for the possible illuminants, and (iii) selects the illuminant having a best gamut difference. For example, the best gamut difference can correspond to the union gamut with the least amount of change relative to its corresponding illuminant gamut.

In another embodiment, the present invention is directed to an image apparatus that includes a capturing system that captures an input image of the scene, and the control system described above.

Moreover, the present invention is also directed to one or more methods for estimating an illuminant of a scene and subsequently providing an adjusted image of the scene.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A illustrates a first illuminant gamut of observable colors for a first possible illuminant;

FIG. 3B illustrates a second illuminant gamut of observable colors for a second possible illuminant;

FIG. 3C illustrates a third illuminant gamut of observable colors for a third possible illuminant;

FIG. 4 illustrates an input gamut of input colors for the input image;

FIG. 5A illustrates a first union gamut of the first illuminant gamut and the input gamut;

FIG. 5B illustrates a second union gamut of the second illuminant gamut and the input gamut;

FIG. 5C illustrates a third union gamut of the third illuminant gamut and the input gamut;

FIG. 7 is a simplified illustration of another embodiment of an image apparatus having features of the present invention.

DESCRIPTION

Figure 1:
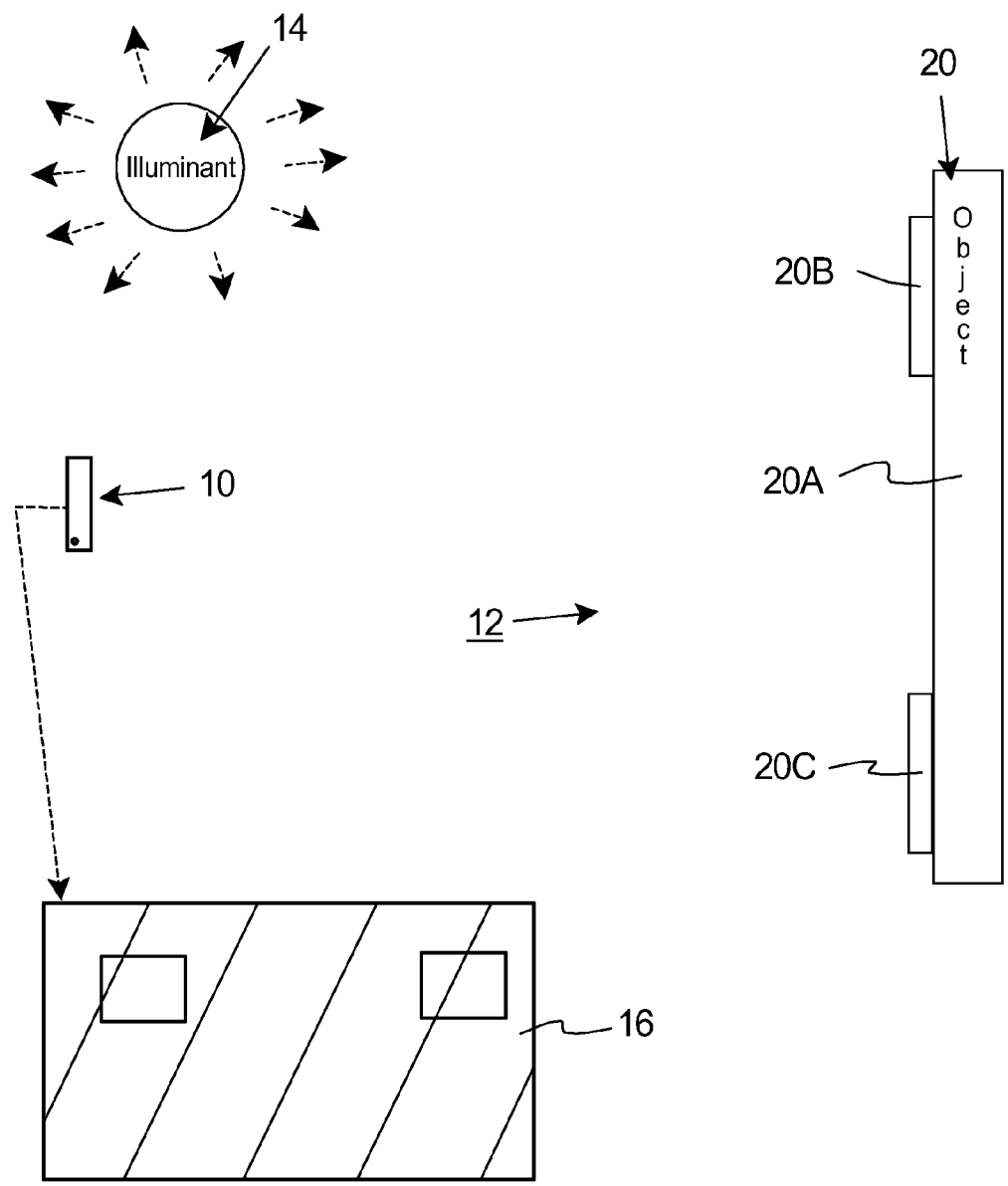
FIG. 1 is a simplified top plan view of a scene, an image apparatus having features of the present invention, and an input image captured by the image apparatus.

The design and location of the illuminant 14 that illuminates the scene 12 can vary greatly. In FIG. 1, the illuminant 14 (illustrated for simplicity as a circle, with arrows extending outwardly away from the illuminant 14 to demonstrate how illumination extends outwardly from the illuminant 14 in substantially all directions) is a fluorescent lamp positioned away from the wall 20A. Non-exclusive examples, of other possible illuminants 14 can include (i) the sun at sunrise with a clear sky, (ii) the sun at sunset with a clear sky, (iii) the sun at midday with a clear sky, (iv) an electronic flash, (v) a flashlight, (vi) the sun with a moderately overcast sky, (vii) the sun with shade or a heavily overcast sky, (viii) an incandescent bulb, or (ix) a candle.

The type of scene 12 captured by the image apparatus 10 can vary. For example, the scene 12 can include one or more objects 20, e.g. animals, plants, mammals, and/or environments. For simplicity, in FIG. 1, the scene 12 is illustrated as including three objects 20. Alternatively, the scene 12 can include more than three or less than three objects 20.

In FIG. 1, one of the objects 20 is a wall 20A, one of the objects 20 is a first painting 20B attached to the wall 20A, and one of the objects 20 is a second painting 20C attached to the wall 20A.

The design and location of the illuminant 14 that illuminates the scene 12 can vary greatly. In FIG. 1, the illuminant 14 is a fluorescent lamp positioned away from the wall 20A. Non-exclusive examples of other possible illuminants 14 can include (i) the sun at sunrise with a clear sky, (ii) the sun at sunset with a clear sky, (iii) the sun at midday with a clear sky, (iv) an electronic flash, (v) a flashlight, (vi) the sun with a moderately overcast sky, (vii) the sun with shade or a heavily overcast sky, (viii) an incandescent bulb, or (ix) a candle.

As is known, the color of each object 20 in the input image 16 will depend upon the characteristics of the illuminant 14, each object's surface reflectance characteristics, and the camera sensor response characteristics. Thus, the color cast of each of the objects 20 will be influenced by the characteristics of the illuminant 14. In FIG. 1, the input image 16 is illustrated with a plurality of "/" to indicate that the color cast of the input image 16 is not correct.

In FIG. 1, the illuminant 14 is positioned outside the scene 12. Alternatively, the illuminant 14 can be part of the scene 12 captured by the image apparatus 10.

In certain embodiments, the image apparatus 10 is water resistant and is adapted to capture images of scenes that are partly or fully in a liquid such as water. Alternatively, the image apparatus 10 can be enclosed by an outer shell (not shown) that surrounds and encloses the image apparatus 10 and that provides a watertight barrier around the image apparatus 10.

Figure 2A:
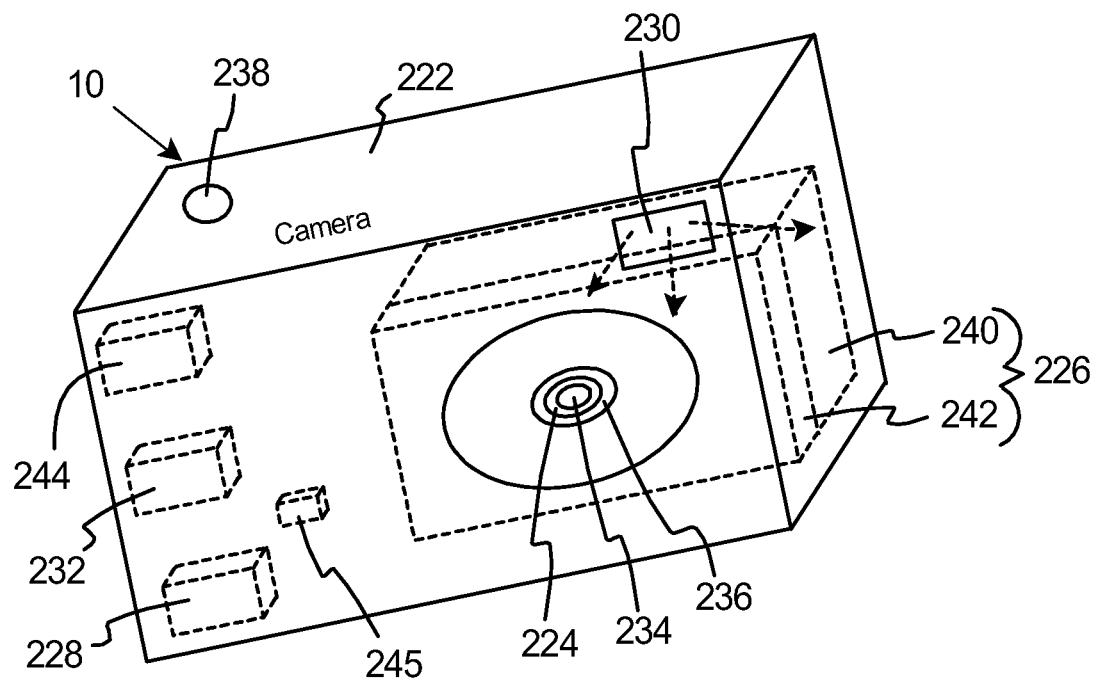
FIG. 2A is a simplified front perspective view of one embodiment of the image apparatus.

FIG. 2A illustrates a simplified, front perspective view of one, non-exclusive embodiment of the image apparatus 10. In this embodiment, the image apparatus 10 is a digital camera, and includes an apparatus frame 222, an optical assembly 224, a capturing system 226 (illustrated as a box in phantom), a power source 228 (illustrated as a box in phantom), a flash system 230, and a control system 232 (illustrated as a box in phantom). The design of these components can be varied to suit the design requirements and type of image apparatus 10. Further, the image apparatus 10 could be designed without one or more of these components. For example, the image apparatus 10 could be designed without the flash system 230.

The apparatus frame 222 can be rigid and support at least some of the other components of the image apparatus 10. In one embodiment, the apparatus frame 222 includes a generally rectangular shaped hollow body that forms a cavity that receives and retains at least a portion of the capturing system 226.

The apparatus frame 222 can include an aperture 234 and a shutter mechanism 236 that work together to control the amount of light that reaches the capturing system 226. The shutter mechanism 236 can be activated by a shutter button 238. The shutter mechanism 236 can include a pair of blinds (sometimes referred to as "blades") that work in conjunction with each other to allow the light to be focused on the capturing system 226 for a certain amount of time. Alternatively, for example, the shutter mechanism 236 can be all electronic and contain no moving parts. For example, an electronic capturing system 226 can have a capture time controlled electronically to emulate the functionality of the blinds.

The optical assembly 224 can include a single lens or a combination of lenses that work in conjunction with each other to focus light onto the capturing system 226. In one embodiment, the image apparatus 10 includes an autofocus assembly (not shown) including one or more lens movers that move one or more lenses of the optical assembly 224 in or out until the sharpest possible image of the subject is received by the capturing system 226.

The capturing system 226 captures information for the input image 416. The design of the capturing system 226 can vary according to the type of image apparatus 10. For a digital type camera, the capturing system 226 can include an image sensor 240 (illustrated in phantom), a filter assembly 242 (illustrated in phantom), and a storage system 244 (illustrated in phantom).

The image sensor 240 receives the light that passes through the aperture 234 and converts the light into electricity. One non-exclusive example of an image sensor 240 for digital cameras is known as a charge coupled device ("CCD"). An alternative image sensor 240 that may be employed in digital cameras uses complementary metal oxide semiconductor ("CMOS") technology.

The image sensor 240, by itself, produces a grayscale image as it only keeps track of the total intensity of the light that strikes the surface of the image sensor 240. In this embodiment, the filter assembly 242 is used to produce a full color image.

It should be noted that other designs for the capturing system 226 can be utilized. It should also be noted, as discussed in more detail below, that with information from the capturing system 226, the control system 232 can selectively compensate the colors in the raw input image 416.

The storage system 244 stores the various images before the images are ultimately printed out, deleted, transferred or downloaded to an auxiliary compensation system (not shown in FIG. 2A), an auxiliary storage system or a printer. The storage system 244 can be fixedly or removable coupled to the apparatus frame 222. Non-exclusive examples of suitable storage systems 244 include flash memory, a floppy disk, a hard disk, or a writeable CD or DVD.

The power source 228 provides electrical power to the electrical components of the image apparatus 10. For example, the power source 228 can include one or more chemical batteries, either the one time use disposable batteries (such as alkaline, zinc-air), or the multiple use rechargeable batteries (such as nickel-cadmium, nickel-metal-hydride, lead-acid, lithium-ion).

The flash system 230 provides a flash of light that can be used to selectively illuminate at least a portion of the scene 12 (illustrated in FIG. 1).

In one embodiment, the control system 232 is electrically connected to and controls the operation of the electrical components of the image apparatus 10. The control system 232 can include one or more processors and circuits and the control system 232 can be programmed to perform one or more of the functions described herein. In FIG. 2A, the control system 232 is coupled to the apparatus frame 222 and is positioned within the apparatus frame 222.

Additionally, as provided herein, the control system 232 includes software that evaluates the input colors from the input image 16 of the scene 12 and uses an illuminant estimation procedure to estimate the illuminant. Subsequently, the control system 232 adjusts the color of the input image 16 based on the estimated illuminant to provide the adjusted image 218.

In one embodiment, an illuminant database 245 (illustrated as a box) is stored in a permanent storage system for access by the control system 232 during the illuminant estimation procedure. The illuminant database 245 stores a separate illuminant gamut 352A-352C (illustrated in FIGS. 3A-3C) that includes the gamut of observable colors for each of a plurality of possible illuminants 350A-350C (illustrated in FIGS. 3A-3C). For example, the illuminant database 245 can store a separate illuminant gamut 352A-352C for at least approximately 5, 10, 15, 20, 25, 30, 35, 40, 50, or more different possible illuminants 350A-350C. Typically, the accuracy of the estimation increases as the number of possible illuminants 350A-350C in the illuminant database 245 is increased.

Non-exclusive, specific examples for possible illuminants 350A-350C in the illuminant database 245 can include (i) a sequence of illuminants with different color temperatures, from low to high (incandescent light and daylight of all sorts) and (ii) several different fluorescent light sources.

Figure 2B:
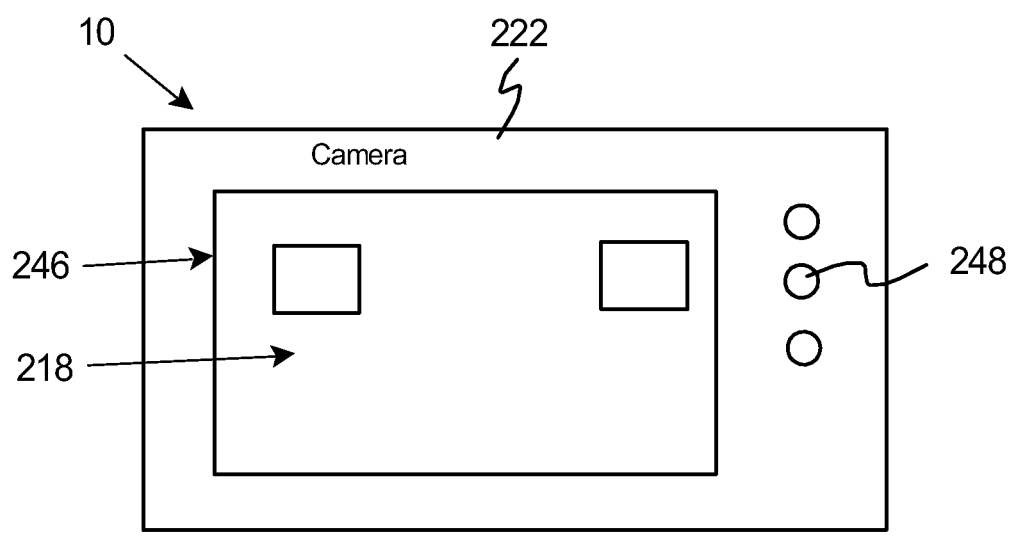
FIG. 2B is a simplified rear view of the image apparatus of FIG. 2A and an adjusted image of the scene of FIG. 1.

Referring back to FIG. 2B, the image apparatus 10 can include an image display 246 that displays the adjusted image 218 and/or the raw input image 16. With this design, the user can decide which images should be stored and which adjusted images should be deleted. In FIG. 2B, the image display 246 is fixedly mounted to the apparatus frame 222 on the back side. Alternatively, the image display 246 can be secured to the apparatus frame 222 with a hinge mounting system (not shown) that enables the display to be pivoted away from the apparatus frame 222. One non-exclusive example of an image display 246 includes an LCD screen.

Further, the image display 246 can display other information such as the time of day, and the date.

Moreover, the image apparatus 10 can include one or more control switches 248 electrically connected to the control system 232 that allows the user to control the functions of the image apparatus 10. Additionally, one or more of the control switches 248 can be used to selectively switch the image apparatus 10 to the white balance adjustment mode in which one or more of the adjustment features disclosed herein is activated.

As an overview, referring to FIGS. 3A-5C, the present method uses a pre-computed separate illuminant gamut 352A-352C of observable colors for each of a plurality of different possible illuminants 350A-350C. In this embodiment, each illuminant gamut 352A-352C is expressed as a binary matrix having a plurality of rows and columns. Further, the control system 232 (illustrated in FIGS. 2A and 2B) converts each input image 16 (illustrated into FIG. 1) into an input gamut 454 that is expressed as a binary matrix having a plurality of rows and columns. Subsequently, in certain embodiments, the control system 232 combines the input gamut 454 with each illuminant gamut 352A-352C to generate a separate union gamut 556A-556C for each of the possible illuminants 350A-350C that is also expressed as a binary matrix having a plurality of rows and columns. Finally, the control system 232 analyzes the union gamuts 556A-556C to estimate the illuminant of the scene 12 (illustrated in FIG. 1).

Figures 3A, 4, 5A:
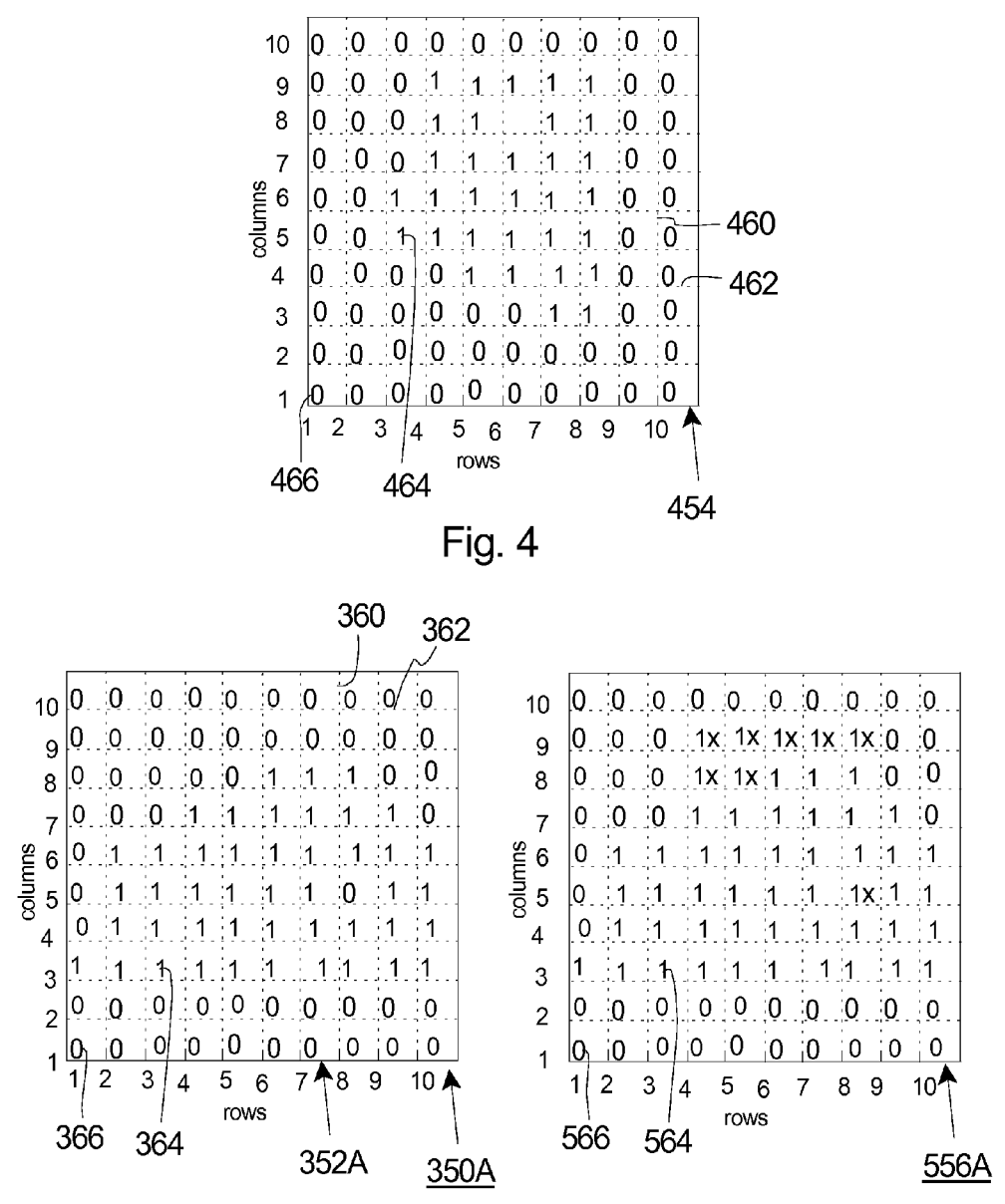
Figures 3B, 3C, 5B, 5C:
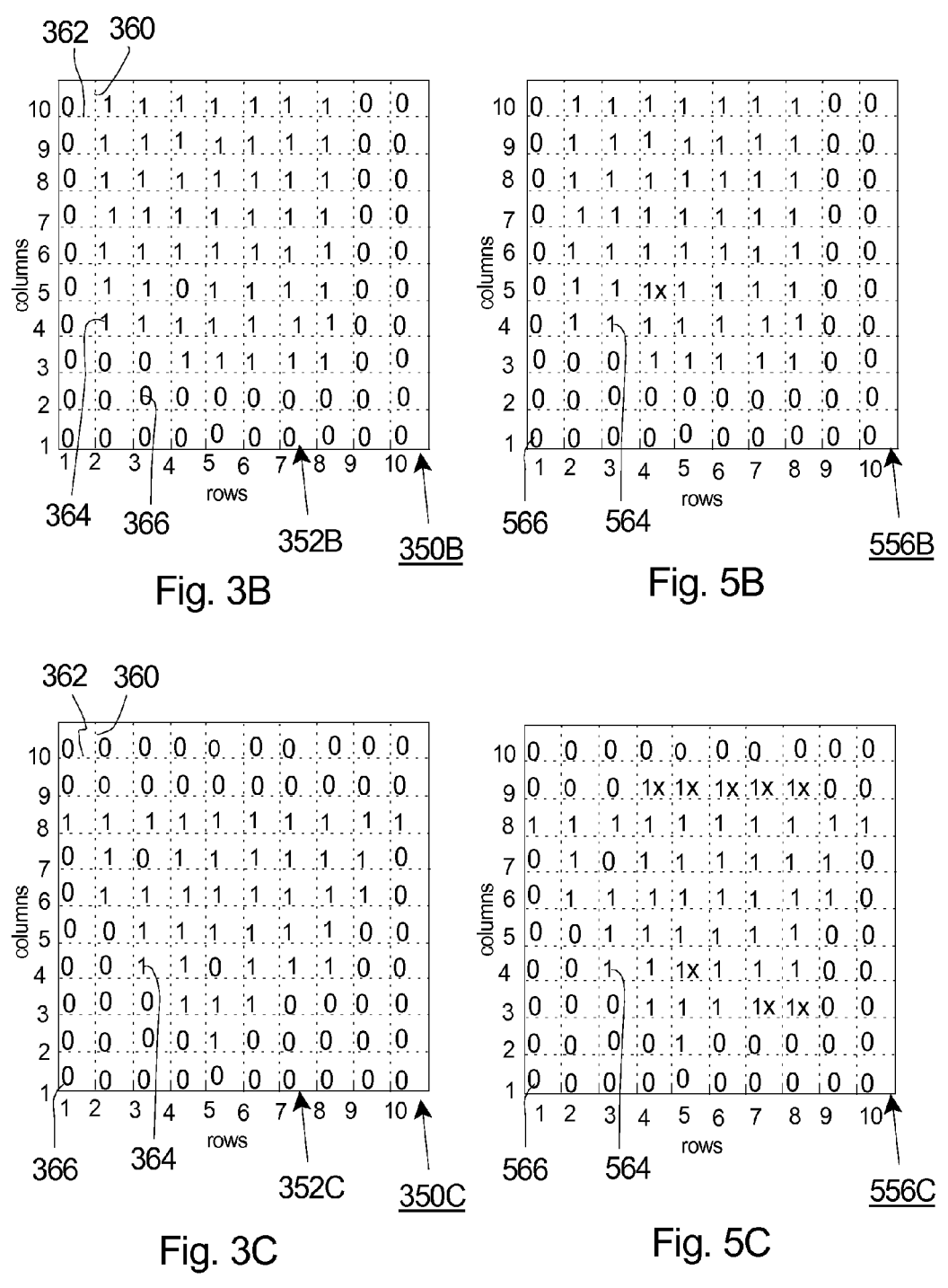

FIG. 3A illustrates a first illuminant gamut 352A of observable colors for a first possible illuminant 350A, FIG. 3B illustrates a second illuminant gamut 352B of observable colors for a second possible illuminant 350B, and FIG. 3C illustrates a third illuminant gamut 352C of observable colors for a third possible illuminant 350C. The illuminant gamuts 352A-352C are just three possible examples of the plurality of illuminant gamuts that can be stored in the storage system 244.

It should be noted that the illuminant gamuts 352A-352C illustrated in FIGS. 3A-3C are merely examples that were created to facilitate this discussion and are not the observable colors for any actual possible illuminant 350A-350C. Further, depending upon the characteristics of the illuminant 350A-350C, the illuminant gamuts 352A-352C can include greater or fewer observable colors than those illustrated in FIGS. 3A-3C.

In the embodiment illustrated in FIGS. 3A-3C, the coordinate system used for the colors represented in each illuminant gamut 352A-352C can be a chromatic space. The exact chromatic space can be selected to achieve the best performance and implementation efficiency of the system. For example, the chromatic scale can be (i) rb (r/g, b/g); (ii) rg (r/b, g/b); (iii) bg (b/r, g/r); (iv) rgb_rb (r/r+g+b, b/r+g+b); (v) rgb_rg (r/r+g+b, g/r+g+b); (vi) rgb_bg (b/r+g+b, g/r+g+b); or (vii) ab. In general, chromaticity spaces with better separation among the different illuminants 350A-350C should result in better illuminant estimation accuracy.

In certain embodiments, the performance of the illuminant estimation is strongly dependent on the accuracy of the illuminant gamuts 352A-352C in the illuminant database 245. One way to build the illuminant database 245 includes directly taking pictures for various illuminants and various scenes. Another way to build the illuminant database 245 is to synthesize the observable illuminant colors for each possible illuminant. Yet another way is a combination of captured images and synthesized images.

In one embodiment, the illuminant gamuts 352A-352C for each of the plurality of possible illuminants 350A-350C is pre-generated and is transferred to the image apparatus 10 for access by the control system 232.

Additionally, in FIGS. 3A-3C, each illuminant gamut 352A-352C is organized as a two dimensional rectangular matrix having plurality of rows 360 (horizontal lines) and a plurality of columns 362 (vertical lines). For convenience, the rows 360 can be labeled from bottom to top starting with row 1, further, the columns 362 can be labeled from left to right starting with column 1.

The number of rows 360 and columns 362 can be varied to achieve the desired size of the illuminant gamuts 352A-352C. In FIGS. 3A-3C, each of the illuminant gamuts 352A-352C has ten rows 360 and ten columns 362. Alternatively, the illuminant gamut 352A-352C can have (i) more than ten or fewer than ten rows 360 and/or (ii) more than ten or fewer than ten columns 362.

In one embodiment, the first illuminant gamut 352A is a sampling, e.g. a representative subset, of the larger gamut of observable colors for the first illuminant 350A. Somewhat similarly, the second illuminant gamut 352B is a sampling, e.g. a representative subset, of the larger gamut of observable colors for the second illuminant 350B. Further, the third illuminant gamut 352C is a sampling, e.g. a representative subset, of the larger gamut of observable colors for the third illuminant 350C.

In one embodiment, the representative subset is obtained by sampling on a regular gamut. This can be depicted by drawing some shape representing the continuous color gamut and superimposing a gamut over it consisting of horizontal and vertical lines. The representative colors are those at the gamut points (line intersections). In one embodiment, the matrix describing the gamut has a first designation 364 at the positions corresponding to those gamut points that lie inside the gamut, and a second designation 366 for those that lie outside the gamut.

For example, for each illuminant, the subset represented in the respective illuminant gamut 352A-352C can include selected features of the observable color gamut such as center, principal angle, length and width, area, or other features. The features can be selected to reflect known differences between the observable colors for the possible illuminants 350A-350C. For example, in a,b chromaticity space, the observable color gamuts for fluorescent illuminants tend to be longer.

As provided herein, each element of the matrix represents a particular color in the selected color space. Further, for each element, the first designation 364 is used if that color is an observable color with that particular illuminant, and the second designation 366 is used if that color is not an observable color with that particular illuminant. In one non-exclusive example, the number "1" can be used as the first designation 364 to represent if that particular color is present, and the number "0" can be used as the second designation 366 to represent if that particular color is not present. For example, in FIG. 3A, at row 3, column 3 the value is "1" because that particular color is observable with the first illuminant 350A, while at row 1, column 1 the value is "0" because that particular color is not observable with the first illuminant 350A. In comparison, in FIG. 3B, at row 3, column 2 the value is "0" because that particular color is not observable with the second illuminant 350B, while at row 2, column 4 the value is "1" because that particular color is observable with the second illuminant 350B. In further comparison, in FIG. 3C, at row 3, column 4 the value is "1" because that particular color is observable with the third illuminant 350C, and at row 1, column 1 the value is "0" because that particular color is not observable with the third illuminant 350C. Thus, in this embodiment, each illuminant gamut 352A-352C is a binary matrix (1=color is present in the illuminant gamut, and 0=color is not present in the illuminant gamut).

Alternatively, for example other designations 364, 366 can be utilized. For example, the number 0 can be the first designation 364 used to represent if that particular color is present, and the number 1 can be the second designation 366 used to represent if that particular color is not present.

FIG. 4 illustrates the input gamut 454 for the input image 16 (illustrated in FIG. 1) that was generated by the control system 232 (illustrated in FIG. 1). In this example, after the input image 16 is captured, the control system 232 determines the input color at each pixel of the input image 16, and generates the input gamut 454. The input gamut 454 illustrated in FIG. 4 is merely an example of a possible input gamut 454 that was created to facilitate this discussion. Further, depending upon the characteristics of the scene 12 and the actual illuminant 14, the input gamut 454 can include greater or fewer input colors and the distribution of these input colors can be different than those illustrated in FIG. 4.

As provided herein, the input gamut 454 is represented in a similar fashion as the illuminant gamuts 352A-352C. More specifically, the input gamut 454 is organized as a two dimensional, rectangular matrix having a plurality of rows 460 (horizontal lines) and a plurality of columns 462 (vertical lines) that is in chromatic space. For convenience, the rows 460 can be labeled from bottom to top starting with row 1, further, the columns 462 can be labeled from left to right starting with column 1. The number of rows 460 and columns 462 can be similar to the illuminants gamuts 350A-350C described above.

In one embodiment, the input gamut 454 is a sampling, e.g. a representative subset, of the larger gamut of input colors captured from the scene 12. This can be depicted by drawing some shape representing the continuous color gamut and superimposing a gamut over it consisting of horizontal and vertical lines. The representative colors are those at the gamut points (line intersections). In one embodiment, the matrix describing the gamut has a first designation 464 at the positions corresponding to those gamut points that lie inside the gamut, and a second designation 466 for those that lie outside. For example, for the input gamut 454, the subset represented can include selected features of the observable color gamut such as center, principal angle, length and width, area, or other features.

As provided herein, each element of the matrix represents a particular color in the matrix. Further, for each element, the first designation 464 is used if the color is an input color captured in the scene 12, and the second designation 466 is used if the color is not an input color captured in the scene 12. In this example, the number "1" can be used as the first designation 464 to represent if that particular input color is present, and the number "0" can be used as the second designation 466 to represent if that particular input color is not present. For example, in FIG. 4, at row 3, column 5 the value is "1" because that particular color was captured in the input image 16, while at row 1, column 1 the value is "0" because that particular color was not captured in the input image 16. In this embodiment, the input gamut 454 is also a binary matrix (1=color is present in the illuminant gamut, and 0=color is not present in the illuminant gamut). Alternatively, for example other designations 464, 466 can be utilized. For example, the number 0 can be the first designation 464 used to represent if that particular color is present, and the number 1 can be the second designation 466 used to represent if that particular color is not present. For convenience, the designations 464, 466 for the input gamut 454 should correspond to the designations 364, 366 for the illuminant gamuts 352A-352C.

In one embodiment, the control system 232 combines the input gamut 454 with each illuminant gamut 352A-352C to generate a separate union gamut 556A-556C for each of the possible illuminants 350A-350C. FIG. 5A illustrates a first union gamut 556A that results from the combination of the first illuminant gamut 350A and the input gamut 454. Somewhat similarly, FIG. 5B illustrates a second union gamut 556B that results from the combination of the second illuminant gamut 350B and the input gamut 454. Further, FIG. 5C illustrates a third union gamut 556C that results from the combination of the third illuminant gamut 350C and the input gamut 454.

In each union gamut 556A-556C, a first designation 564 is used if the color is present in one of (i) the input gamut 454 and (ii) the respective illuminant gamut 352A-352C; and a second designation 566 is used if the color is not present in either (i) the input gamut 454 or (ii) the respective illuminant gamut 352A-352C. In this example, the number "1" can be used as the first designation 464, and the number "0" can be used as the second designation 466. For example, in FIG. 5A, at row 3, column 3 the value is "1" because that particular color is in at least one of the input gamut 454 and the first illuminant gamut 352A; while at row 1, column 1 the value is "0" because that particular color is not in the input gamut 454 or the first illuminant gamut 352A. In comparison, in FIG. 5B, at row 3, column 4 the value is "1" because that particular color is in at least one of the input gamut 454 and the second illuminant gamut 352B; while at row 1, column 1 the value is "0" because that particular color is not in the input gamut 454 or the second illuminant gamut 352B. In further comparison, in FIG. 5C, at row 3, column 4 the value is "1" because that particular color is in at least one of the input gamut 454 or the third illuminant gamut 352C; and at row 1, column 1 the value is "0" because that particular color is not present in the input gamut 454 and the third illuminant gamut 352C. In this embodiment, each union gamut 556A-556C is again a binary matrix.

Additionally, in FIGS. 5A-5C, an "X" has been added to highlight when the color exists in the input gamut 454 and not the corresponding illuminant gamut 352A-352C.

Next, in certain embodiments, the control system 232 evaluates the union gamuts 556A-556C to estimate the illuminant. In one embodiment, the control system 232 evaluates the union gamuts 556A-556C to determine if the input gamut 454 is a subset (or close to a subset) of each illuminant gamut 352A-352C. For example, the control system 232 can select the illuminant for the particular union gamut 556A-556C that differs the least to its corresponding illuminant gamut 352A-352C. In contrast, if the particular union gamut 556A-556C differs significantly from its corresponding illuminant gamut 352A-352C, then the input image was probably not captured under than particular illuminant.

The tests used to compare two sets of gamuts can be varied to achieve the desired performance of the system. For example, the features such as area, center of mass, length, principal angle etc. can be used when comparing the gamuts. For example, in one embodiment, the term "differ the least" could mean that the area of the difference of the two sets is the smallest. Alternatively, the term "differ the least" could rely on other features of the sets to specify, what is meant by "differs the least" (e.g. the center differs the least, the length and width differs the least, etc.). Using different features for measuring when the sets differ the least may influence results significantly. Some features may capture typical differences better than others.

In the embodiment illustrated in the Figures, the second illuminant 350B is selected because the second union gamut 556B is closest to the second illuminant gamut 352B. Stated in another fashion, because the input gamut 454 only slightly influences the second union gamut 556B (there is only one "X" in FIG. 5B, while FIG. 5A contains 18 "X's" and FIG. 5C contains 18 "X's"). Thus, in this example, the input gamut 454 is mainly a subset of the second illuminant gamut 352B. As a result thereof, the control system 232 selects the second illuminant 350B as the estimated illuminant and the control system 232 performs white balance correction on the input image 16 based on the second illuminant 350B.

It should be noted that there may be some gaps in gamuts due to inaccurate gamut measurements. When the area of the difference between the two sets is computed, these gaps may pose a problem, if there are too many of them. Thus, using some other feature (length, angle, center of mass) might achieve better results when comparing gamuts.

Additionally, other information can also be utilized to make the choice of the most likely illuminant more accurate, such as the use of automatic exposure data for the image apparatus 10. For example, when the exposure data is known, the strength of the scene illumination can be determined. Outdoor scenes (during the day) have typically much stronger light levels than indoor scenes (at least when it comes to regular room lighting). Therefore, if it is determined that there was a lot of light from the exposure data, it is very likely that the picture was taken outside, and for example, fluorescent illuminants can be excluded from the search. As is known, fluorescent illuminants can be relatively hard to detect.

Moreover, the present invention can provide "how much" and "in what direction" the girds differ. For example, if the center of the union is shifted towards blue in comparison with the given illuminant observable color gamut, it is known that the illuminant under which the picture was taken probably had higher color temperature and we may decide to skip checking those with lower color temperatures.

As provided herein, computing union gamuts 556A-556C and their features may be computationally more efficient than other ways of comparing illuminant gamuts to input colors. Stated in another fashion, with this design, the image apparatus 10 can accurately estimate the possible illuminant of the scene 12 with relatively simple computations. This improves the performance of the image apparatus 10 and reduces the cost to manufacture the image apparatus 10.

Figure 6:
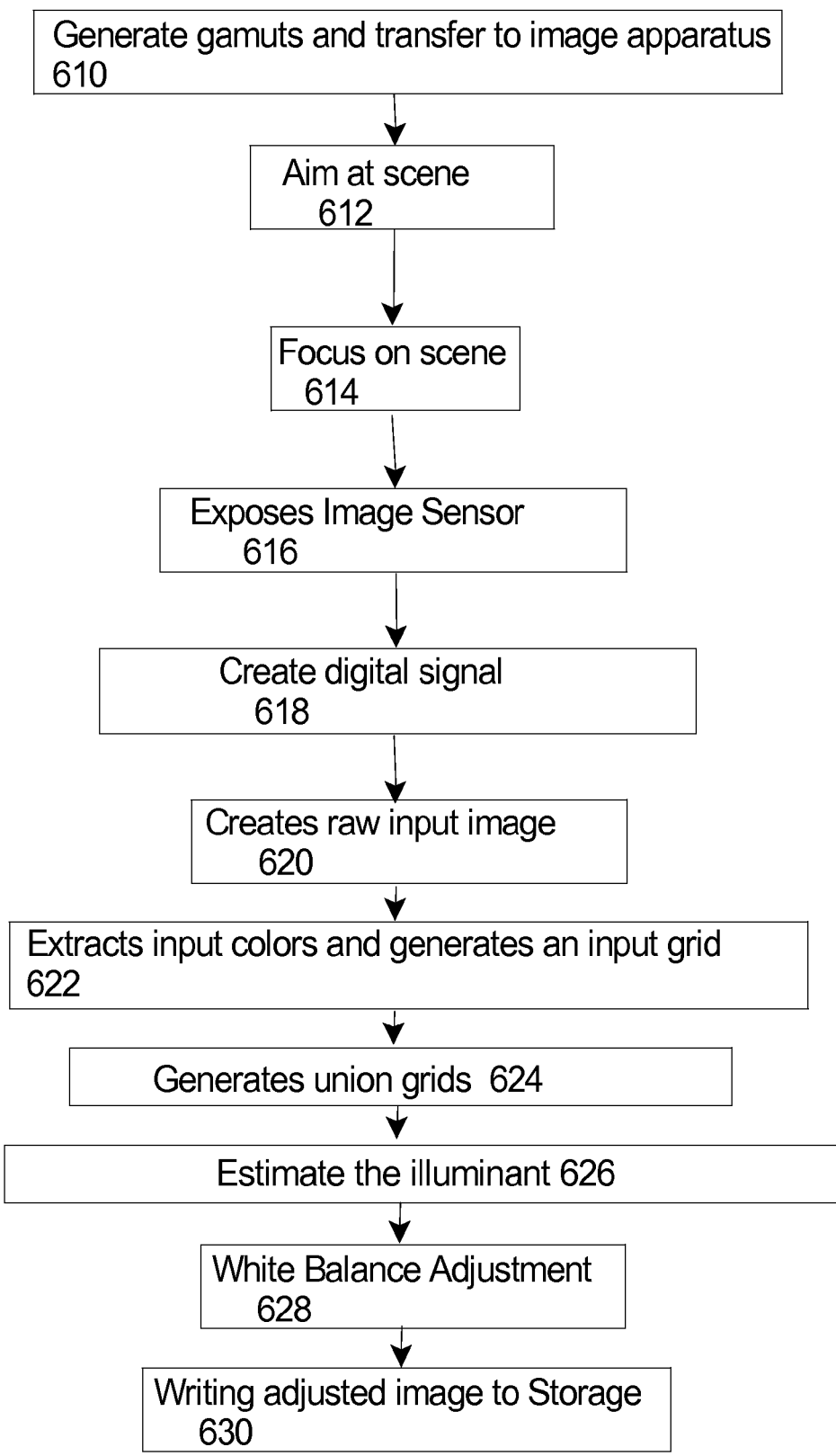
FIG. 6 is a flowchart that illustrates the operation of the image apparatus.

FIG. 6 is a simplified flow chart that further illustrates one non-exclusive example the operation of the image apparatus. It should be noted that one or more of the steps can be omitted or the order of steps can be switched. Moreover, it should be noted that one or more important parts of image processing have not been illustrated in FIG. 6. Non-exclusive examples of excluded steps from FIG. 6 in the image processing can include (i) a demosaicing step (necessary in most color cameras) that can be done before or after the white balance adjustment step, and (ii) a gamma correction application of tonal curves that can be performed after the white balance adjustment step.

First, the illuminant gamuts for the desired possible illuminants are generated and are transferred to the image apparatus 610. Next, the image apparatus is aimed toward the scene 612. Subsequently, the user presses lightly on the shutter button to enable the image apparatus to automatically focus on the object(s) 614. Next, the user presses the shutter button all the way, which resets the image sensor, and exposes the image sensor to light 616. Next, the ADC measures the charge at each photosite of the image sensor and creates a digital signal that represents the values of the charge at each photosite 618. Subsequently, the control system interpolates the data from the different photosites, with assistance from the filtering component, to create the input image 620. Next, the control system extracts the input colors from the input image and generates the input gamut 622.

Subsequently, the control system generates the plurality of union gamuts 624. Next, the control system compares the union gamuts to the illuminant gamuts to estimate the illuminant 626. Subsequently, the control system performs color correction on the input image based on the estimated illuminant 628. Finally, the adjusted image 630 can be written to a memory card or other storage media.

Optionally, a small version of the adjusted image can be displayed by the camera.

Figure 7:
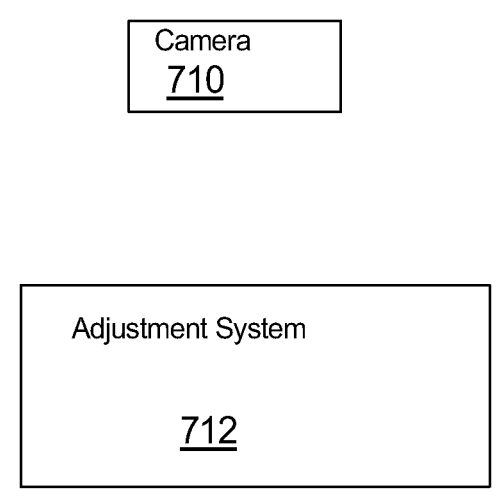

FIG. 7 is a simplified illustration of a combination having features of the present invention, including a camera 710, and a post-processing adjustment system 712. In this embodiment, the camera 710 captures the input image (not shown in FIG. 7) and the adjustment system 712 estimates the illuminant and performs the appropriate levels of white balance adjustment to the input image. In this embodiment, the adjustment system 712 includes a control system with software that (i) evaluates the input image to estimate the illuminant as provided above, and (ii) performs white balance adjustment on the input image based on the estimated illuminant.

In this embodiment, as provided herein, the raw image is stored in the camera 710 for future development. In this situation, the camera 710 can estimate the illuminant and write that information with the other information (such as exposure data) about the raw image. Next, this information can be transferred to the adjustment system 712 for future processing. Alternatively, the adjustment system 712 can be used to estimate the illuminant.

In FIG. 7, the captured image can be transferred to the adjustment system 712 via an electrical connection line (not shown), a wireless connection, or in another fashion. For example, the camera 710 can include a removable storage system (not shown in FIG. 7) that is selectively removed from the camera 710 and inserted into a docking port (not shown) of the adjustment system 712.

The design of the adjustment system 712 can be varied. For example, the adjustment system 712 can be a personal computer that includes the appropriate software.

It should be noted that the flowchart illustrated in FIG. 6 can be used to illustrate the capturing and development of the image using the system disclosed in FIG. 7. More specifically, some of the steps in FIG. 6 are performed by the camera 710 while other steps are performed by the adjustment system 712. For example, the camera 710 is used to create the raw input image that is transferred to the adjustment system 712 that is used to "develop" the adjusted image.

It should also be noted that the methods of estimating the possible illuminant described above can be used in combination with one or more other prior art automatic white balance algorithms. For example, the gamut method disclosed herein can be used in conjunction with a "gray world" illuminant estimation approach, a "white patch" illuminant estimation approach, or variations thereof.

In the "gray world" illuminant estimation approach, it is assumed that for an image of sufficiently varied colors, the average surface reflectance is "gray". Therefore, it simply takes the average colors of the image as the gray color and adjusts the image accordingly.

In the "white patch" illuminant estimation approach, it is assumed that the brightest pixels of an image reflect the actual color of the light source. This would be especially relevant for pixels corresponding to a point on glossy or specular surfaces. This method searches for these pixels and takes them as the scene illuminant color.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A system for estimating an illuminant of a scene that was captured by an input image that includes a plurality of input colors, the system comprising:
    a control system that generates an input gamut organized as a matrix having a plurality of rows and a plurality of columns that includes the input colors for the input image, the control system including an illuminant database having a separate illuminant gamut of the observable colors for each of a plurality of potential illuminants, each illuminant gamut being expressed as a matrix having a plurality of rows and a plurality of columns; and the control system compares the input gamut organized as the matrix with the plurality of rows and columns to the illuminant gamut organized as the matrix with the plurality of rows and columns for each of the potential illuminants,
    wherein the control system combines the input gamut with each of the illuminant gamuts to generate a separate union gamut for each of the possible illuminants, wherein each union gamut is organized as a matrix having a plurality of rows and a plurality of columns.

2. The system of claim 1 wherein the control system compares the union gamut that is organized as the matrix having the plurality of rows and columns and the corresponding illuminant gamut that is organized as the matrix having the plurality of rows and columns for each possible illuminant to estimate the illuminant.

3. The system of claim 2 wherein the control system determines a gamut difference between the union gamut that is organized as the matrix having the plurality of rows and columns and the corresponding illuminant gamut that is organized as the matrix having the plurality of rows and columns for each possible illuminant, and the control system compares the gamut differences for the possible illuminants and selects the illuminant having a best gamut difference.

4. The system of claim 3 wherein the best gamut difference corresponds to the union gamut with the least amount of change relative to its corresponding illuminant gamut.

5. The system of claim 1 wherein each gamut is a binary matrix.

6. The system of claim 1 wherein a coordinate system for each color is in chromatic space.

7. A method for estimating an illuminant of a scene that was captured by an input image that includes a plurality of input colors, the method comprising the steps of:
    providing an illuminant database having a separate illuminant gamut of the observable colors for each of a plurality of potential illuminants, each illuminant gamut being expressed as a matrix having a plurality of rows and a plurality of columns;
    generating an input gamut that includes the input colors for the input image with a control system, the input gamut being organized as a matrix having a plurality of rows and a plurality of columns; and
    comparing the input gamut organized as the matrix with the plurality of rows and columns to the illuminant gamut organized as the matrix with the plurality of rows and columns for each of the potential illuminants,
    wherein the step of comparing combining the input gamut with each of the illuminant gamuts to generate a separate union gamut for each of the possible illuminants, wherein each union gamut is organized as a matrix having a plurality of rows and a plurality of columns.

8. The method of claim 7 wherein the step of comparing includes comparing the union gamut that is organized as the matrix having the plurality of rows and columns and the corresponding illuminant gamut that is organized as the matrix having the plurality of rows and columns for each possible illuminant to estimate the illuminant.

9. The method of claim 8 wherein the step of comparing includes the step of determining a gamut difference between the union gamut that is organized as the matrix having the plurality of rows and columns and the corresponding illuminant gamut that is organized as the matrix having the plurality of rows and columns for each possible illuminant, comparing the gamut differences for the possible illuminants, and selecting the illuminant having a best gamut difference.

10. The method of claim 7 wherein the matrix is binary.

11. A system for estimating an illuminant of a scene, the system comprising:
    a capturing system that captures an input image of the scene, the input image including a plurality of input colors; and
    a control system that generates an input gamut that includes the input colors for the input image, the input gamut being organized as a binary, two dimensional matrix having a coordinate system that is in the chromatic space and having a plurality of rows and a plurality of columns that includes the input colors for the input image; the control system accessing an illuminant database having a separate illuminant gamut of the observable colors for each of a plurality of potential illuminants, each illuminant gamut being expressed as a binary, two dimensional matrix having a coordinate system that is in the chromatic space and having a plurality of rows and a plurality of columns; and the control system compares the input gamut organized as the matrix with the plurality of rows and columns to the illuminant gamut organized as the matrix with the plurality of rows and columns for each of the potential illuminants, wherein the control system combines the input gamut with each of the illuminant gamuts to generate a separate union gamut for each of the possible illuminants, wherein each union gamut is organized as a two dimensional matrix having a coordinate system that is in the chromatic space and having a plurality of rows and a plurality of columns, and wherein the union gamut for each possible illuminant includes each color present in at least one of the respective illuminant gamut and the input gamut.

12. The system of claim 11 wherein the control system compares the union gamut that is organized as the matrix having the plurality of rows and columns and the corresponding illuminant gamut that is organized as the matrix having the plurality of rows and columns for each possible illuminant to estimate the illuminant.

13. The system of claim 12 wherein the control system determines a gamut difference between the union gamut that is organized as the matrix having the plurality of rows and columns and the corresponding illuminant gamut that is organized as the matrix having the plurality of rows and columns for each possible illuminant, and the control system compares the gamut differences for the possible illuminants and selects the illuminant having a best gamut difference.

14. The system of claim 13 wherein the step of selecting the best gamut difference includes the step of selecting the union gamut with the least amount of change relative to its corresponding illuminant gamut.

15. The system of claim 13 wherein the step of determining a gamut difference includes comparing at least one of the following features (i) an area, (ii) a center of mass, (iii) a length, and (iv) a principal angle.

* * * * *